US012626957B2

(12) United States Patent
Kang

(10) Patent No.: US 12,626,957 B2
(45) Date of Patent: May 12, 2026

(54) BATTERY CELL AND METHOD OF MANUFACTURING THE SAME

(71) Applicant: SK INNOVATION CO., LTD., Seoul (KR)

(72) Inventor: Hee Gyoung Kang, Daejeon (KR)

(73) Assignee: SK On Co., Ltd., Seoul (KR)

( * ) Notice: Subject to any disclaimer, the term of this patent is extended or adjusted under 35 U.S.C. 154(b) by 0 days.

(21) Appl. No.: 16/555,932

(22) Filed: Aug. 29, 2019

(65) Prior Publication Data

US 2020/0127270 A1     Apr. 23, 2020

(30) Foreign Application Priority Data

Oct. 23, 2018     (KR) ........................ 10-2018-0126857

(51) Int. Cl.
H01M 10/0587      (2010.01)
H01M 50/103      (2021.01)
(Continued)

(52) U.S. Cl.
CPC ..... H01M 10/0587 (2013.01); H01M 50/103 (2021.01); H01M 50/105 (2021.01);
(Continued)

(58) Field of Classification Search
CPC ...... H01M 2/266; H01M 2/0217; H01M 2/08; H01M 10/0587; H01M 10/0413; H01M 10/0431; H01M 10/613; H01M 10/647; H01M 10/6551; H01M 50/54; H01M 50/55; H01M 50/102–105; H01M 50/116; H01M 50/124; H01M 50/176; H01M 50/178; H01M 50/548; H01M 50/553; H01M 50/557; H01M 10/058; H01M 10/049; H01M 50/20–282; H01M 50/533;
(Continued)

(56) References Cited

U.S. PATENT DOCUMENTS 6,387,567 B1 *    5/2002    Noh ..................... H01M 50/172
                                                                                            429/185
7,404,559 B2 *    7/2008    Yoshimura ............. B65H 7/125
                                                                                            271/262
(Continued)

FOREIGN PATENT DOCUMENTS

CN            101276888 A          10/2008
CN            101714652 A          5/2010
(Continued)

OTHER PUBLICATIONS

Machine translation of KR 2018-0017364; accessed and printed May 21, 2021 (Year: 2018).*
(Continued)

*Primary Examiner* — Mayla Gonzalez Ramos
*Assistant Examiner* — Bethany C Garcia
(74) *Attorney, Agent, or Firm* — IP & T GROUP LLP

(57)                ABSTRACT

The present invention provides a battery cell and a method of manufacturing the same. In particular, since a case of the battery cell may have poor thermal resistance, the present invention provides a battery cell capable of preventing a coating layer including an insulation layer in the case and an electrode assembly from being damaged by heat, and releasing the heat generated in the battery.

6 Claims, 7 Drawing Sheets

(51) Int. Cl.

| | |
|---|---|
| *H01M 50/105* | (2021.01) |
| *H01M 50/178* | (2021.01) |
| *H01M 50/54* | (2021.01) |
| *H01M 50/548* | (2021.01) |
| *H01M 50/55* | (2021.01) |
| *H01M 50/553* | (2021.01) |
| *H01M 50/557* | (2021.01) |

(52) U.S. Cl.
CPC .......... *H01M 50/178* (2021.01); *H01M 50/54* (2021.01); *H01M 50/548* (2021.01); *H01M 50/55* (2021.01); *H01M 50/553* (2021.01); *H01M 50/557* (2021.01)

(58) Field of Classification Search
CPC .... H01M 50/14; H01M 50/19; H01M 50/466; H01M 50/474; H01M 50/10; H01M 50/131; H01M 50/133; H01M 50/136; H01M 50/543; H01M 10/052; H01M 10/0525; H01M 10/0585; H01M 50/147; H01M 50/148; H01M 50/155; H01M 50/166; H01M 50/183; H01M 50/184; H01M 10/04; H01M 50/24; Y02E 60/12; Y02E 60/10; B60L 50/64; B29L 2031/7146; H05K 5/00–0004; Y10T 10/70; Y02P 70/50
USPC ........................................................ 429/161
See application file for complete search history.

(56) References Cited

U.S. PATENT DOCUMENTS

| | | | | |
|---|---|---|---|---|
| 2004/0175611 | A1 * | 9/2004 | Otohata ................... | H01M 2/30 |
| | | | | 429/127 |
| 2005/0106453 | A1 | 5/2005 | Yamauchi et al. | |
| 2007/0231683 | A1 | 10/2007 | Lee et al. | |
| 2013/0189570 | A1 * | 7/2013 | Park ........................ | H01M 2/08 |
| | | | | 429/185 |
| 2015/0010800 | A1 * | 1/2015 | Park .................... | H01M 2/0202 |
| | | | | 429/94 |
| 2015/0333375 | A1 * | 11/2015 | Kwon ................. | H01M 2/0207 |
| | | | | 429/178 |
| 2015/0340662 | A1 * | 11/2015 | Kwon ................. | H01M 50/105 |
| | | | | 429/94 |
| 2016/0380245 | A1 | 12/2016 | Kang | |
| 2017/0170437 | A1 * | 6/2017 | Lee ..................... | H01M 2/0275 |
| 2020/0168852 | A1 * | 5/2020 | Oh ......................... | B29C 53/02 |

FOREIGN PATENT DOCUMENTS

| | | | | | |
|---|---|---|---|---|---|
| CN | 103069284 | A | | 4/2013 | |
| JP | 2001102615 | A | | 4/2001 | |
| JP | 2004071301 | A | | 3/2004 | |
| JP | 2007073437 | A | | 3/2007 | |
| JP | 2015153513 | A | | 8/2015 | |
| JP | 2017-022072 | A | | 1/2017 | |
| JP | 2018106811 | A | * | 7/2018 | .............. B60K 1/00 |
| KR | 20040078553 | A | | 9/2004 | |
| KR | 101253671 | B1 | | 4/2013 | |
| KR | 20140100032 | A | | 8/2014 | |
| KR | 10-2016-0073233 | A | | 6/2016 | |
| KR | 10-2017-0022156 | A | | 3/2017 | |
| KR | 20170022156 | A | * | 3/2017 | |
| KR | 10-2017-0088024 | A | | 8/2017 | |
| KR | 20170088024 | A | * | 8/2017 | |
| KR | 10-2018-0017364 | A | | 2/2018 | |
| KR | 20180017364 | A | * | 2/2018 | |
| KR | 10-2018-0054617 | | | 5/2018 | |
| KR | 20210036703 | A | * | 4/2021 | ............ H01M 50/10 |

OTHER PUBLICATIONS

English-Language Machine Translation—Koichiro, JP 2018106811 A—Espacenet (Accessed Apr. 12, 2023) (Year: 2023).*

English-Language Machine Translation—Park, KR-20210036703-A—Espacenet (Accessed Apr. 19, 2023) (Year: 2023).*

Cho, KR 20180017364 A: Updated Machine Translation via Espacenet (previously cited on PTO-892 mailed Dec. 17, 2020) (Year: 2024).*

Extended European Search Report issued by the EPO on Mar. 23, 2020.

Office Action for the European Patent Application No. 19193495.9 issued by the European Patent Office on Jul. 25, 2023.

Office Action for the Chinese Patent Application No. 201910885506.8 issued by the Chinese Patent Office on Sep. 12, 2023.

Office Action for the Japanese Patent Application No. 2019-160898 issued by the Japanese Patent Office on Sep. 26, 2023.

Office Action on the Korean Patent Application No. 10-2018-0126857 issued by the Korean Patent Office on Dec. 16, 2023.

Notice of Allowance for the Chinese Patent Application No. 201910885506.8 issued by the Chinese Patent Office on Jan. 26, 2024.

Office Action for the Japanese Patent Application No. 2019-160898 issued by the Japanese Patent Office on Mar. 5, 2024.

* cited by examiner

BATTERY CELL AND METHOD OF MANUFACTURING THE SAME

CROSS-REFERENCE TO RELATED APPLICATION

This application claims priority to Korean Patent Applications No. 10-2018-0126857 filed on Oct. 23, 2018 in the Korean Intellectual Property Office (KIPO), the entire disclosure of which is incorporated by reference herein.

BACKGROUND OF THE INVENTION

1. Field of the Invention

The present invention relates to a battery cell and a method of manufacturing the same.

2. Description of the Related Art

In modern society, the demand for secondary batteries is rapidly increasing across the industry such as a mobile device or an automobile, and studies into the secondary battery are actively conducted. A case (sheath) of the secondary battery is formed through a process of forming a space in which an electrode assembly is housed by pressing a foil. After the electrode assembly (a jelly roll) is inserted into the inner space of the case molded through the above-described process, end portions of the molded case are sealed to manufacture the secondary battery.

The case is formed of a metal layer containing mostly aluminum and a coating layer applied to the aluminum layer, such that it is susceptible to heat and stress. In addition, an electrolyte contained in the case together with the electrode assembly has a risk of explosion and a disadvantage that thermal stability is deteriorated. Therefore, it is important to have a structure that prevents the case as well as the electrode assembly, the electrolyte, and the like contained in the case from being damaged by heat, and releases the heat generated in the battery.

For example, Korean Patent Laid-Open Publication. No. 10-2018-0054617 (published on May 24, 2018 discloses a separator for a chemical device such as a secondary battery and a chemical device including the separator, however, it did not solve the above-described problems.

SUMMARY OF THE INVENTION

It is an object of embodiments of the present invention to provide a battery cell which is excellent in insulation resistance and has an increased flatness on one side of the battery cell, thereby maximizing a cooling effect during assembling the battery cells in a battery module.

In addition, another object of embodiments of the present invention is to provide a battery cell capable of preventing a damage to a separator due to heat.

Further, another object of embodiments of the present invention is to provide a method of manufacturing a battery cell capable of maximizing a cooling effect during assembling the battery cells n a battery module, and preventing a damage to a separator due to heat.

To achieve the above objects, according to an aspect of the present invention, there is provided a battery cell including an electrode assembly and a case configured to house the electrode assembly, wherein the case includes a first member configured to cover a lower side of the housed electrode assembly and a second member configured to cover an upper side of the electrode assembly, wherein the first member and the second member are connected to each other at one side thereof to form an close contact surface with which the electrode assembly is brought into close contact, and are sealed along the other sides except for the one side, the first member includes a first recess part configured to provide a space in which the lower side of the electrode assembly is housed, and a first sealing part configured to be sealed with the second member, the second member includes a second recess part configured to provide a space in which the upper side of the electrode assembly is housed, and a second sealing part configured to be sealed with the first member, and a distance from a first boundary located inside of a portion of the first sealing part, which is sealed with the second sealing part to a first outer surface of the first recess part, which is located on the first sealing part side is longer than a distance from a second boundary located inside of the second sealing part to a second outer surface of the second recess part, which is located on the second sealing part side.

In addition, according to another aspect of the present invention, there provided a battery cell including an electrode assembly and a case configured to house the electrode assembly, wherein the case includes a first member configured to cover a lower side of the housed electrode assembly and a second member configured to cover an upper side of the electrode assembly, wherein the first member and the second member are connected to each other at one side, and sealed along the other sides except for the one side, the first member includes a first recess part configured to provide a space in which the lower side of the electrode assembly is housed, and a first sealing part configured to be sealed with the second member, the second member includes a second recess part configured to provide a space in which the upper side of the electrode assembly is housed, and a second sealing part configured to be sealed with the first member, and a space formed between the first member and the electrode assembly in an inner space formed by the case is smaller than a space formed between the second member and the electrode assembly.

Further, according to another aspect of the present invention, there is provided a battery cell including an electrode assembly and a case configured to house the electrode assembly, wherein the case includes a first member configured to cover a lower side of the housed electrode assembly and a second member configured to cover an upper side of the electrode assembly, wherein the first member and the second member are connected to each other at one side, and sealed along the other sides except for the one side, the first member includes a first recess part configured to provide a space in which the lower side of the electrode assembly is housed, and a first sealing part configured to be sealed with the second member, the second member includes a second recess part configured to provide a space in which the upper side of the electrode assembly is housed, and a second sealing part configured to be sealed with the first member, and a side face of the first recess part is located closer to the electrode assembly side than a side face of the second recess part on the one side to which the first member and the second member are connected.

Herein, the first recess part and the second recess part respectively may have a smaller depth formed at the one side thereof than a depth formed at the other side of the first recess part and the second recess part.

Further, the close contact surface may have a longer length than a length in which the case extends in a direction perpendicular to a longitudinal direction of the close contact surface.

Further, the close contact surface may have a longer length at least two times than the length in which the case extends in the direction perpendicular to the longitudinal direction of the close contact surface.

Further, the first recess part and the second recess part may have inner volumes different from each other.

Further, the second recess part may have a larger inner volume than the inner volume of the first recess part.

Further, the second recess part may have a smaller inner volume than the inner volume of the first recess part.

Further, the first recess part and the second recess part may have the same depth formed therein, while the second recess part has a smaller inner volume formed therein than an inner volume of the first recess part formed therein.

Furthermore, the first boundary and the second boundary may be located on the same vertical line.

Further, according to another aspect of the present invention, there is provided a method of manufacturing a battery cell which includes an electrode assembly and a case configured to house the electrode assembly, the method including: forming a first recess part configured to provide space in which the lower side of the electrode assembly is housed, and a second recess part configured to provide a space in which the upper side of the electrode assembly is housed; housing the electrode assembly in the first recess part, and then housing the electrode assembly in the second recess part while one side to which the first recess part and the second recess part are connected is brought into close contact with the electrode assembly; and sealing the case.

According to the embodiments of the present invention it is possible to minimize a damage to the coating layer caused by the heat.

Further, according to the embodiments of the present invention, a damage to the separator of the electrode assembly by the heat may be minimized.

Further, according to the embodiments of the present invention, it is possible to provide a battery cell having excellent cooling efficiency.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1A:
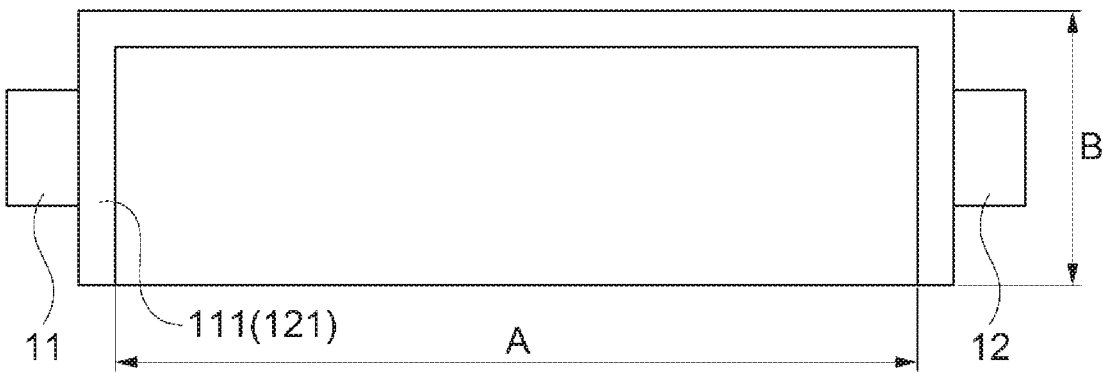
FIGS. 1A and 1B are plan views of a battery cell according to an embodiment of the present invention.

Hereinafter, specific embodiments of the present invention will be described with reference to the accompanying drawings. The following detailed description is provided to contribute to a comprehensive understanding of a method, apparatus, and/or system described herein. However, these embodiments merely illustrative examples, and the present invention is not limited thereto.

In descriptions of the embodiments of the present invention, publicly known techniques that are judged to be able to make the purport of the present invention unnecessarily obscure will not be described in detail. Referring to the drawings, wherein like reference characters designate like or corresponding parts throughout the several views. In addition, the terms as used herein are defined by taking functions of the present disclosure into account and can be changed according to the custom or intention of users or operators. Therefore, definition of the terms should be made according to the overall disclosure set forth herein.

In addition, the terminology used herein is for the purpose of describing particular embodiments only and is not intended to limit the present invention thereto. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Further, it will be understood that, although the terms first, second, etc. may be used herein to describe various elements, components or sections, these elements, components or sections should not be limited by these terms. These terms are only used to distinguish one element, component or section from another element, component or section. Thus, a first element, component or section discussed below could be termed a second element, component or section without departing from the teachings of the present invention.

Furthermore, directional terms such as "one side," "the other side," "upper," "lower," and the like are used in connection with the orientation of the disclosed drawings. Since the components of the embodiments of the present invention may be located in various orientations, the directional terms are used for illustrative purposes, and are not intended to limit the present invention thereto.

Figure 1B:
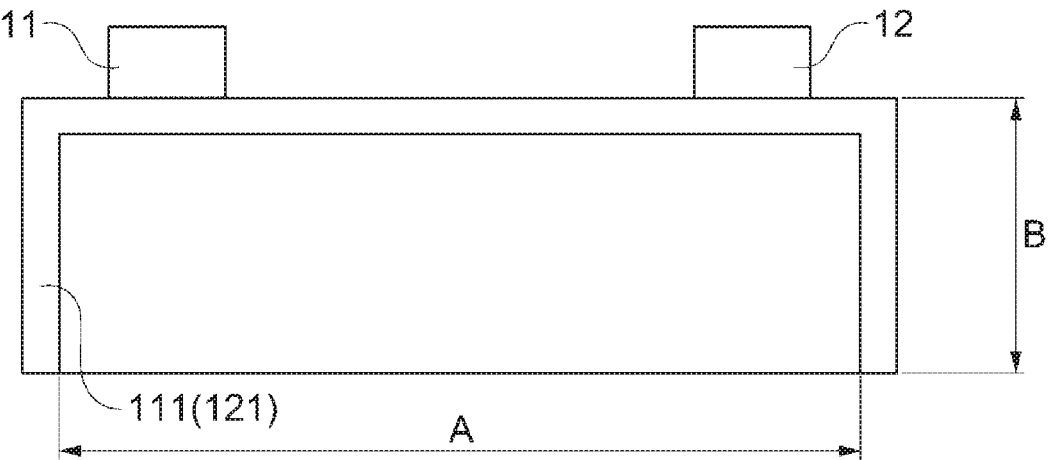

FIGS. 1A and 1B are plan views of a battery cell 10 according to an embodiment of the present invention. In general, the secondary battery may be configured so as to form a basic unit by the battery cells 10 each of which includes an electrode assembly 50 (FIGS. 5A and 5B) and case 100 having the electrode assembly 50 housed therein.

The electrode assembly may include a cathode (not illustrated), an anode (not illustrated), and a separator 55 (FIGS. 5A and 5B) for separating the cathode and the anode.

The case 100 may include a metal layer formed of aluminum or the like, and a coating layer that performs an insulation function so as to prevent the electrode assembly 50 and the metal layer from being electrically communicated with each other.

The battery cell 10 according to the embodiment of the present invention may include the electrode assembly 50, and the case 100 for housing the electrode assembly 50. The case 100 may include a first member 110 configured to cover a lower side of the electrode assembly 50 and a second member 120 configured to cover an upper side of the electrode assembly 50.

The first member 110 may include a first recess part 112 capable of providing a space in which the electrode assembly 50 is housed, and first sealing part 111 for sealing with the second member 120.

The second member 120 may include a second recess part 122 capable of providing the space in which the electrode assembly 50 is housed, and a second sealing part 121 for sealing with the first member 110.

The first sealing part 111 and the second sealing part 121 are parts that provide sections to be sealed, and it is not necessary for the whole part referred to as the sealing part to be sealed. For example, as described low, a portion of the first sealing part 111, which is not sealed with the second sealing part 121, may extend to an inside of the case 100.

The first member 110 and the second member 120 may be connected to each other at one side 50 (FIG. 3), and sealed along the other sides except for the one side 150. At this time, the electrode assembly 50 may be brought into close contact with a surface of the one side 150. Therefore, the surface of the one side 150 may be referred to as an close contact surface.

The first member 110 and the second member 120 may be portions of one case 100. Accordingly, the present disclosure, the first member 110 and the second member 120 may be referred to separately for the convenience of explanation, and may not be separated from each other or may not be separately formed.

As illustrated in FIG. 1A, an electrode tab may include a cathode tap 11 and an anode tap 12 drawn in directions opposite to each other, and as illustrated in FIG. 1B, the electrode tab may include the cathode and anode taps drawn out in parallel in the same direction as each other.

As illustrated in FIGS. 1A and 1B, the close contact surface 150 may have a length A which is longer than a length B in which the case 100 extends in a direction perpendicular to a longitudinal direction of the close contact surface 150.

A cooling plate (not illustrated) or the like may be attached to the close contact surface 150. In order to improve cooling efficiency by the cooling plate, it may be important that the cooling plate and the case 100 having the electrode assembly 50 housed therein are in contact with each other across a large area.

By increasing the length of the close contact surface 150, an area in which the cooling plate and the case 100 are in contact with each other may be increased. As described above, the battery cell 10 according to the embodiment of the present invention is advantageous over the conventional battery cell in terms of the cooling efficiency.

A ratio of the length A of the close contact surface 150 and the length B in which the case 100 extends in the direction perpendicular to the longitudinal direction of the close contact surface 150 need not be constant, and may be appropriately selected by a user depending on the shape or size of the secondary battery. However, when the length A of the close contact surface 150 is longer at least two times than the length B in which the case 100 extends in the direction perpendicular to the longitudinal direction of the close contact surface 150, the cooling efficiency may be more improved.

Figure 2:
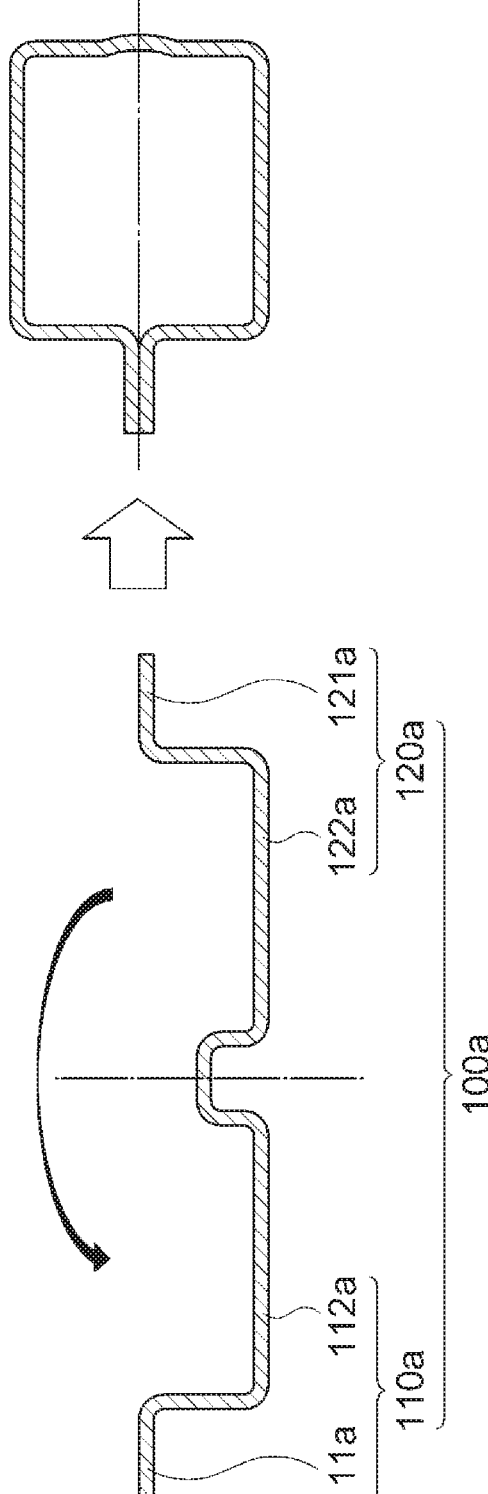
FIG. 2 is a cross-sectional view illustrating a method of forming a cell by a case.

FIG. 2 is a cross-sectional view illustrating a method of forming the cell a case 100a. The case 100a may include a first member 110a and a second member 120a. At this time, the first member 110a may include a first recess part 112a configured to provide a space for housing the lower side of the electrode assembly and a first sealing part 111a for sealing with the second member 120a. Similarly, the second member 120a may include a second recess part 122a configured to provide a space for housing the upper side of the electrode assembly and a second sealing part 121a for sealing with the first member 110a. As illustrated in FIG. 2, the first recess part 112a and the second recess part 122a may be formed through a forming process, but it is not limited thereto. The first recess part 112a may be formed so as to cover the lower side of the electrode assembly, and the second recess part 122a may be formed so as to cover the upper side of the electrode assembly.

At this time, as illustrated in FIG. 2, the end portion of the first sealing part 111a and the end portion of the second sealing part 121a are sealed so as to be coincide with each other, thus to form the battery cell.

At this time, as, illustrated in FIG. 2, a space formed by the first recess part 112a and the electrode assembly and a space formed by the second recess part 122a and the electrode assembly may be equal to each other.

Figure 3:
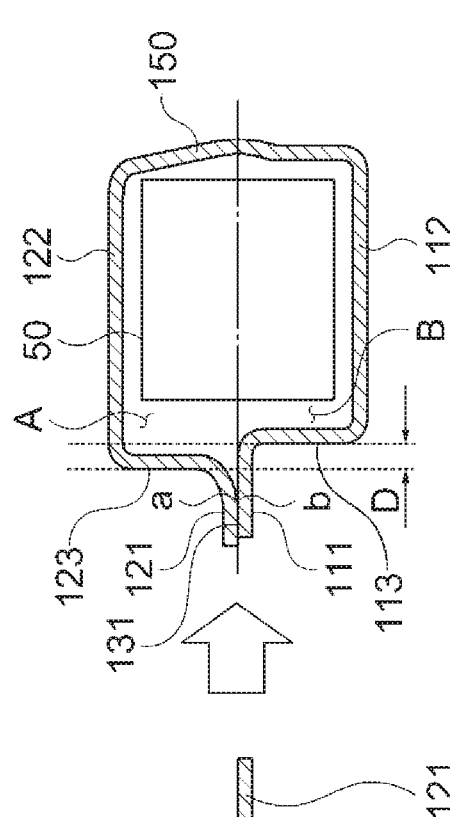
FIG. 3 is a cross-sectional view of a case of a battery cell according to another embodiment of the present invention.
Figure 3:
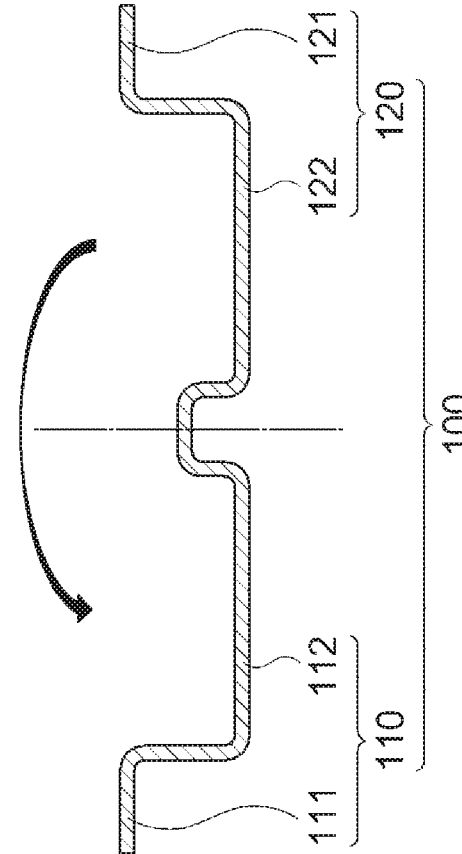

FIG. 3 is a cross-sectional view of a case 100 of a battery cell according to another embodiment of the present invention. Referring to FIG. 3, the case 100 may include a first member 110 and a second member 120. When forming the space in which the electrode assembly 50 is housed, it may be configured in such a way that a space A formed by the electrode assembly 50 and the second member 120 is larger than a space B formed by the electrode assembly 50 and the first member 110. Specifically, a lower space formed in first member 110 by the electrode assembly 50 and the first member 110 on the first sealing part 111 side based on a contact surface 131 on which the first sealing part 111 and the second sealing part 121 are in contact with each other may be smaller than an upper space formed in the second member 120 by the electrode assembly 50 and the second member 120 on the second sealing part 121 side based on the contact surface 131 on which the first sealing part 111 and the second sealing part 121 are in contact with each other.

In addition, a case 100 of a battery cell according to another embodiment of the present invention may be configured such a way that, when forming a contact surface by the second sealing part 121 of the second member 120 and the first sealing part 111 of the first member 110, a boundary between the first recess part 112 and the first sealing part 111 on a side opposite to the one side 150 to which the first member 110 and the second member 120 are connected is located closer to the electrode assembly 50 than a boundary between the second recess part 122 and the second sealing part 121. At this time, it is not necessary for the first sealing part 111 and the second sealing part 121 to form the contact surface so that their end portion are coincide with each other. Therefore, the end portions of the first sealing part 111 and the second sealing part 121 may be sealed so as not to be coincide with each other but to be slightly deviated. However, it is not limited thereto.

For example, in the battery cell whose electrode tabs are drawn out in both direction as illustrated in FIG. 1A, the end portions of the sealing parts 111 and 121 may be cut, and the end portions of the sealing parts 111 and 121 may be coincide with each other due to the cut end portions of the sealing parts 111 and 121.

However, in the battery cell whose electrode tabs are drawn out in one direction as illustrated in FIG. 1B, it is difficult to cut the end portions of the sealing parts 111 and 121, therefore the end portions thereof may be formed so as not to be coincide with each other but to be deviated.

The first sealing part 111 and the second sealing part 121 may form the contact surface 131 as described above. The contact surface 131 may be a surface in which the first sealing part 111 and the second sealing part 121 come into contact with each other when sealing the case 100.

The first sealing part 111 of the first member 110 may be a portion for sealing the case 100, and may be a portion for forming the contact surface 131 with the second sealing part 121. The second sealing part 121 of the second member 120 may be a portion for sealing the case 100, and may be a portion for forming the contact surface 131 with the first sealing part 111.

The boundary of the first sealing part 111, which is located at an inner position in the contact surface 131 on the electrode assembly 50 side, that is, located inside of the sealed portion of the first sealing part 111 may be referred to as a first boundary b, and the boundary of the second sealing part 121, which is located at the inner position in the contact surface 131 on the electrode assembly 50 side, that is, located inside of the sealed portion of the second sealing part 121 may be referred to as a second boundary a. At this time, a portion of the first sealing part 111, which is not sealed, may be formed to extend into the electrode assembly 50 by a predetermined length.

The first boundary b and the second boundary a may be formed on the same vertical line, and the boundary in the first member 110 may the first boundary b and the boundary in the second member 120 may be the second boundary a.

A difference between the distance from the first boundary b to a first outer surface 113 located outside the inner space the first recess part 112, specifically, on the first sealing part 111 side of the first recess part 112 and the distance from the second boundary a to a second outer surface 123 located outside the inner space of the second recess part 122, specifically, on the second seal part 121 side of the second recess part 122 may be a separation distance D.

At this time, the distance from the first boundary b to the first outer surface 113 located outside the inner space of the first recess part 112, specifically, on the first sealing part 111 side of the first recess part 112 may be longer than the distance from the second boundary a to the second outer surface 123 located outside the inner space of the second recess part 122, specifically, on the second seal part 121 side of the second recess part 122.

That is, the second outer surface 123 may be formed so as to protrude more the sealing parts 111 and 121 side than the first outer surface 113. At this time, the distance in which the second outer surface 123 protrudes from the first outer surface 113 may be the separation distance D.

Figure 4A:
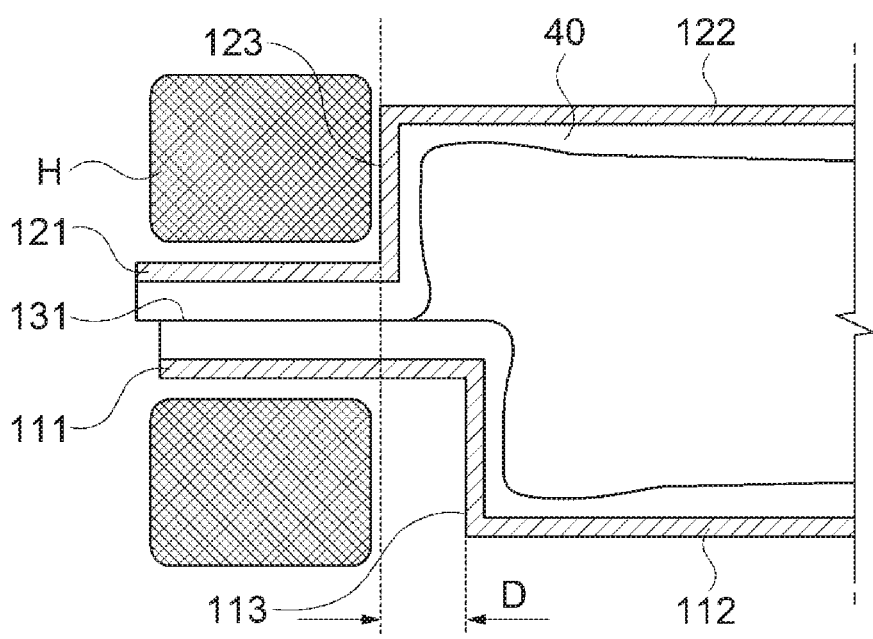
FIGS. 4A and 4B are cross-sectional views illustrating a state in which battery cell according to the embodiment of the present invention is sealed.
Figure 4B:
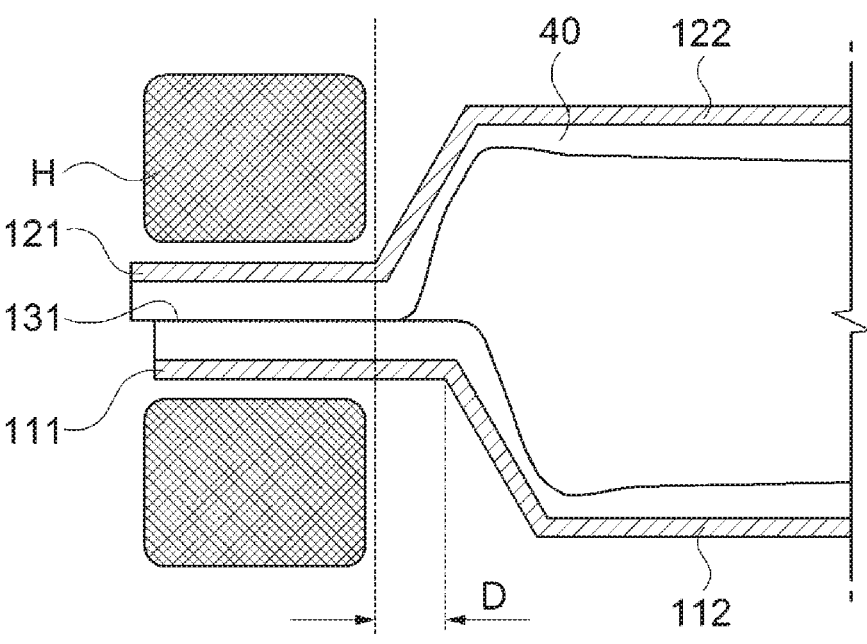

When the outer surfaces 113 and 123 of the first and second recess parts 112 and 122 on the sealing parts 111 and 121 side are slantly formed as illustrated in FIG. 4B, an inclination distance slantly formed downward from the first boundary a to the first recess part 112 may be longer than an inclination distance slantly formed upward from the second boundary b to the second recess part 122.

In the battery cell 10 according to another embodiment of the present invention, a space formed between the first member 110 and the electrode assembly 50 in the internal space formed by the case 100 may be smaller than the space formed between the second member 120 and the electrode assembly 50.

In order to form the separation distance D, the case 100 may be formed so that a portion corresponding to the second member 120 on the one side 150, to which the first member 110 and the second member 120 are connected, is curved. As the one side 150 is formed so as to be curved, the electrode assembly 50 and the case 100 may be closely contacted with each other. When the electrode assembly 50 and the case 100 are brought into close contact with each other, an empty space formed between the electrode assembly 50 and the case 100 may be reduced, thereby improving the cooling efficiency. When forming the case 100, the electrode assembly 50 is housed in the first recess part 112, and then the electrode assembly 50 is housed in the second recess part 122 while one side 150 is brought into close contact with the electrode assembly 50, followed by sealing the sealing parts to form the battery cell 10.

When using the battery cell 10, heat may be generated in the electrode assembly 50. However, it may be important to appropriately cool the battery cell 10 for maintaining the efficiency thereof. Considering heat transfer, the heat generated in the electrode assembly 50 may be transmitted to an outside of the case 100 by going through the space formed between the electrode assembly 50 and the case 100 and the case 100 in this order. At this time, when a cooling plate (not illustrated) is disposed outside the case 100, the smaller the size of the space formed between the electrode assembly 50 and the case 100, the less heat that cannot be discharged to the outside of the case 100, and the cooling efficiency may be improved.

Figure 5A:
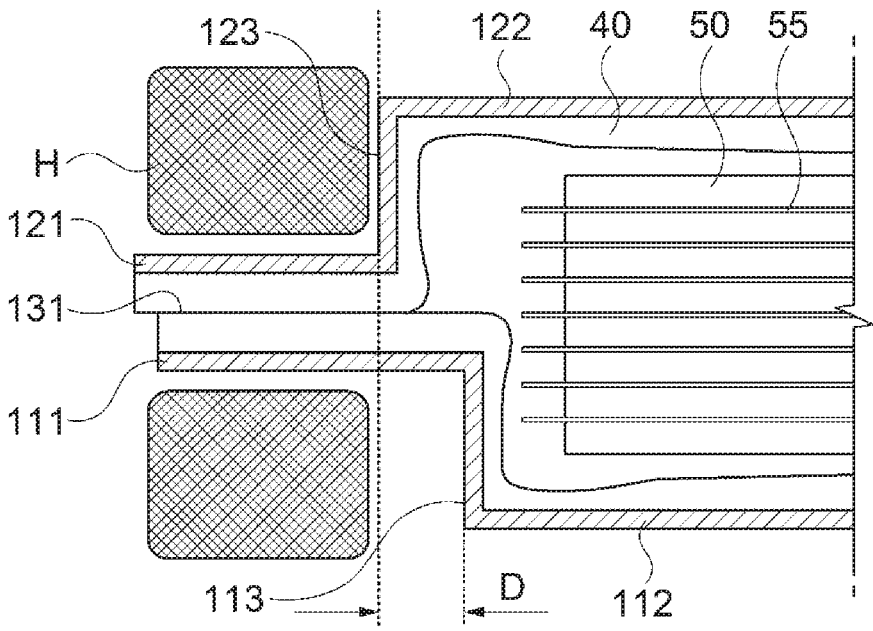
FIGS. 5A and 5B cross-sectional views illustrating a state in which the battery cell having electrode assemblies inserted therein according to the embodiment of the present invention is sealed.
Figure 5B:
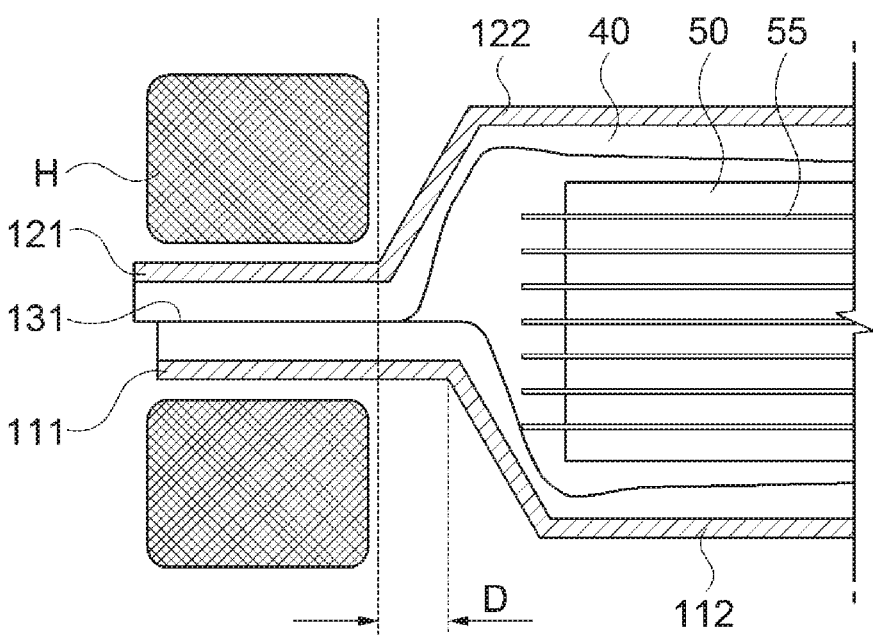

FIGS. 4A and 4B are cross-sectional views illustrating a state in which the battery cell 10 according to the embodiment of the present invention is sealed, and FIGS. 5A and 5B are cross-sectional views illustrating a state in which the battery cell 10 having electrode assemblies 50 inserted therein according to the embodiment of the present invention is sealed.

In order to prevent moisture from penetrating into the case after the electrode assembly is housed in the case of the secondary battery and prevent the electrode assembly from being electrically communicated with the outside, the case of the secondary battery should be sealed. The larger the sealed area, the smaller the space in which the electrode assembly 50 can be housed, such that the available space may be reduced. However, if the sealed area is too small, the reliability of the sealing may be deteriorated and is vulnerable to an external shock. Therefore, when an impact that's not big is applied to the used device or in daily life, the secondary battery may lose its original function. Therefore, it may be important to form an area to be sealed to a minimum while allowing the secondary battery to reliably perform the original function.

Referring to FIGS. 4A and 4B, the case 100 may include a coating layer 40 for insulation or the like formed thereon as described above. When the first sealing part 111 and the second sealing part 121 are sealed by a heating means H, a distance between the heating means H and the coating layer 40 formed on an inner surface of the case 100 is short, such that the coating layer 40 may be damaged by heat. Since the electrode assembly 50 and an electrolyte (not illustrated) may be contained in the battery cell 100 and the case 100 includes the metal layer, if the coating layer 40 is damaged by the heating means H, insulation failure may occur while the sealing parts are sealed in a state in which the electrolyte is flown in the damaged coating layer 40. To solve this problem, as illustrated in FIG. 3, when the first boundary b and the second boundary a have the separation distance D therebetween, the coating layer 40 formed on the first member 110 side may be less likely to be damaged by heat. Therefore, according, to the embodiment of the present invention, the insulator failure in, the case 100 may be remarkably reduced.

Referring to FIGS. 5A and 5B, if the first boundary and the second boundary are formed so as to have the separation distance D therebetween, when the electrode assembly 50 is housed in the case 100, the electrode assembly 50 will be spaced apart from the heating means H by the separation distance D compared to a case of having no separation distance D. In FIGS. 4A and 4B, the coating layer 40 is spaced apart from the heating means H by the separation distance D, such that the insulation failure of the case 100 may be prevented, and therefore the electrode assembly 50 may be less affected by the heat.

The electrode assembly 50 may be referred to as a jelly roll, and the electrode assembly 50 may include the cathode, the anode, and the separator 55 provided to separate the cathode and the anode from each other. In the separator 55, high shielding properties and insulating properties may be required, as well as a low resistance may be required. If the separator 55 is defective, the cathode and the anode may be connected to each other, thereby resulting in a short circuit. However, for example, in a case of using a separator made of a polyolefin having a low thermal resistance as a raw material, the separator may be damaged by the heat generated between manufacturing processes due to the low thermal resistance, thereby resulting in a short circuit between the cathode and the anode.

When the separator 55 is further away from the heating, means H by the separation distance D than the conventional structure as described above, an occurrence of internal short circuit in the electrode assembly due to the damage to the separator may be remarkably reduced.

As illustrated in FIGS. 4A and 5A, similar to one side, the other side of each of the first recess part 112 and the second recess part 122 may be formed in a vertical direction (a), or as illustrated in FIGS. 4B and 5B, may be formed so as to be inclined. The forms of the first recess part 112 and the second recess part 122 on the other side are not limited to the form illustrated in FIGS. 4 and 5.

Figure 6A:
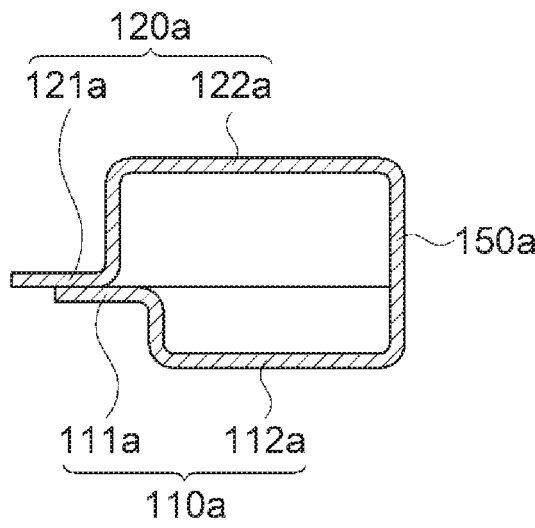
FIGS. 6A to 6C are cross-sectional views illustrating various cases of the battery cell including first and second recess parts having different depths and volumes according to embodiments of the present invention.
Figure 6B:
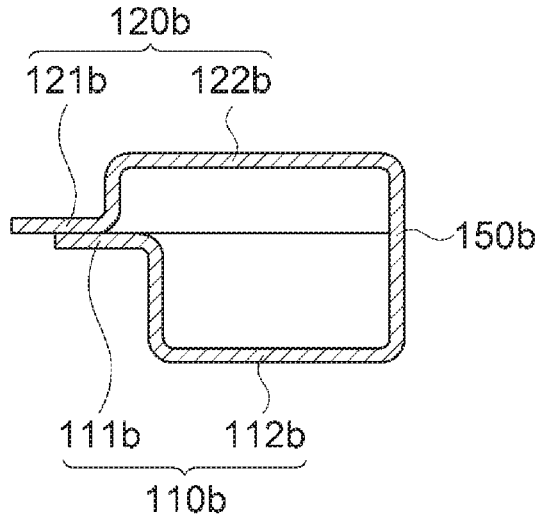
Figure 6C:
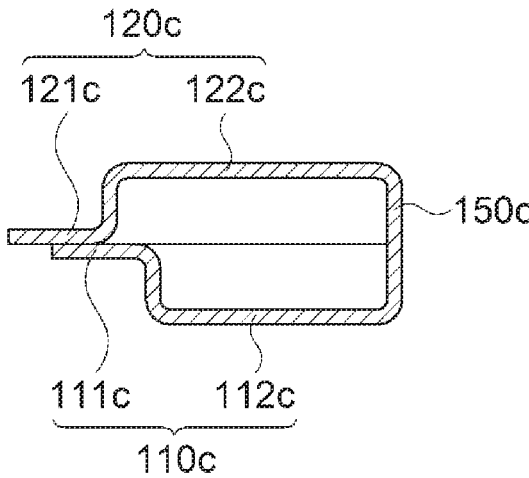

FIGS. 6A to 6C are cross-sectional views illustrating various cases of the battery cell including first and second recess parts having different depths and volumes according to embodiments of the present invention. FIG. 6A is a cross-sectional view illustrating that the first recess part 112a has an inner volume smaller than an inner volume of the second recess part 122a, and the electrode assembly 50 is brought into close contact with one side 150a and then the second recess part 122a covers the electrode assembly 50 to form a case. FIG. 6B is a cross-sectional view illustrating a case in which the first recess part 112b has larger depth than the depth of the second recess part 122b, and FIG. 6C is a cross-sectional view illustrating that the first recess part 112c has a larger inner volume than the inner volume of the second recess part 122c, as well as the electrode assembly 50 is brought into close contact with one side 150c and then the second recess part 122c covers the electrode assembly 50 to form a case.

When the depth of the first recess part 112 side is smaller than the depth of the second recess part 122 side, an area in which the electrode assembly 50 can be brought into close contact with the first side 150 may be increased, thereby increasing the cooling efficiency. Since the first recess part 112 and the second recess part 122 have different depths from each other, the inner volume of the second recess part 122 may be larger than the inner volume of the first recess part 112. However, since the depth of the second recess part 122 is large, it may be difficult to house the electrode assembly 50.

Referring to FIG. 6A, since the other side of the second recess part 122a protrudes from the other side of the first recess part 112a, it may be more convenient when housing the electrode assembly 50.

Unlike FIG. 6A, FIG. 6B illustrates a case in which the depth of the first recess part 112b is larger than the depth of the second recess part 122b, which may be advantageous when the electrode assembly 50 is brought into close contact with the case 100 by forming the first recess part 112b so as to have a size matching with that of the electrode assembly 50. In addition, since the depth of the second recess part 122b is small, it is possible to easily cover the electrode assembly 50. When the case has the structure as illustrated in FIG. 6B, failure entailed in housing the electrode assembly 50 may be reduced.

FIG. 6C is a cross-sectional view illustrating a case in which the first recess part 112c and the second recess part 122c have the same depth formed therein, but the second recess part 122c has a larger inner volume formed therein than the inner volume of the first recess part 112c formed therein. Even when forming the battery cell 10 as illustrated in FIGS. 6A and 6C, is possible to reduce the failure entailed in housing the electrode assembly 50.

While the present invention has been particularly illustrated and described with reference exemplary embodiments thereof, it is to be understood that the invention is not Limited to the disclosed exemplary embodiments, but, on the contrary. Therefore, the scope of the present invention should not be limited to the above-described embodiments, but should be determined by equivalents to the appended claims, as well as the appended claims.

DESCRIPTION OF REFERENCE NUMERALS

10: Battery cell
11: Cathode tap
12: Anode tap
40: Coating layer
50: Electrode assembly
55: Separator
100: Case
110: First member
111: First sealing part
112: First recess part
113: First outer surface
120: Second member
121: Second sealing part
122: Second recess part
123: Second outer surface
131: Contact surface
150: Close contact surface

What is claimed is:

1. A battery cell comprising:
an electrode assembly; and
a case configured to house the electrode assembly,
wherein the case includes:
a first member configured to cover a lower portion of the electrode assembly, and
a second member configured to cover an upper portion of the electrode assembly and sealing with the first member,
wherein a first rear side of the first member and a second rear side of the second member are continuously connected and positioned behind the electrode assembly,
wherein the first member includes:
a first recess part configured to provide a space in which the lower side of the electrode assembly is housed and form the first rear side of the first member, and
a first sealing part extending forward from an upper end of the first recess part,
wherein the second member includes:

a second recess part configured to provide a space in which the upper side of the electrode assembly is housed and form the second rear side of the second member, and a second sealing part extending forward from a lower end of the second recess part and in contact with the first sealing part, wherein the second rear side of the second member includes:

a second rear side body leaning forward, and a second rear edge portion bent forward from an upper end of the second rear side body, wherein the first rear side of the first member includes:

a first rear side body connected to the second rear side body, and a first rear edge portion which forms a lower end of the first rear side body, wherein a front end of the second sealing part is in front of a front end of the first sealing part, and wherein a rear end of the second sealing part is in front of a rear end of the first sealing part, wherein the front end of the first sealing part and the front end of the second sealing part are positioned in front of the electrode assembly, wherein the second rear side is inclined toward the electrode assembly with respect to the first rear side, and the second rear edge portion is positioned closer to the electrode assembly than the first rear edge portion.

2. The battery cell according to claim 1, wherein the first recess part and the second recess part have a smaller depth formed at a front side of the case than a depth formed at a rear side of the case.

3. The battery cell according to claim 1, wherein the rear side of the first member and the rear side of the second member form a close contact surface, wherein the close contact surface has a longer length than a length in which the case extends in a direction perpendicular to a longitudinal direction of the close contact surface.

4. The battery cell according to claim 3, wherein the close contact surface has a longer length at least two times than the length in which the case extends in the direction perpendicular to the longitudinal direction of the close contact surface.

5. The battery cell according to claim 1, wherein the first recess part and the second recess part have inner volumes different from each other.

6. A battery cell comprising:

an electrode assembly; and a case enclosing the electrode assembly, the case including a first member including a first recess part and a first sealing part and a second member including a second recess part and a second sealing part, wherein a lower portion of the electrode assembly is covered inside the first recess part, and a remaining upper portion of the electrode assembly is covered inside the second recess part, wherein the second recess part is larger in width than the first recess part, wherein the first and second members form a close contact side with which the electrode assembly is brought into close contact, wherein the close contact side is positioned behind of the electrode assembly, wherein the first and second sealing parts are sealed along the other sides of the case except for the one close contact side, wherein an upper part of the close contact side includes:

an upper part body leaning forward; and an upper part edge portion bent forward from an upper end of the upper part body, and wherein a lower part of the close contact side includes:

a lower part body connected to the upper part body; and a lower part edge portion which forms a lower end of the lower part body, wherein a front end of the second sealing part is in front of a front end of the first sealing part, and a rear end of the second sealing part is in front of a rear end of the first sealing part, wherein the front end of the first sealing part and the front end of the second sealing part are positioned in front of the electrode assembly, and wherein the upper part body is inclined toward the electrode assembly with respect to the lower part body, and the upper part edge portion is positioned closer to the electrode assembly than the lower part edge portion.

* * * * *